United States Patent [19]

Tang et al.

[11] Patent Number: 4,639,923
[45] Date of Patent: Jan. 27, 1987

[54] OPTICAL PARAMETRIC OSCILLATOR USING UREA CRYSTAL

[75] Inventors: Chung L. Tang, Ithaca, N.Y.; William F. Donaldson, Pittsford, N.Y.

[73] Assignee: Cornell Research Foundation, Inc., Ithaca, N.Y.

[21] Appl. No.: 612,756

[22] Filed: May 21, 1984

[51] Int. Cl.$^4$ .............................................. H01S 3/10
[52] U.S. Cl. ........................................ 372/21; 372/20; 372/41; 372/23; 372/66; 372/5; 372/72; 307/427; 307/428; 330/4.5
[58] Field of Search .................... 372/21, 4, 5, 23, 20, 372/41, 69, 72, 66, 39; 307/428, 427; 330/4.5

[56] References Cited

PUBLICATIONS

Donaldson et al; "Urea Optical Parametric Oscillator"; Appl. Phys. Lett., vol. 44, No. 1; Jan. 1, 1984.
Halbout et al; "Efficient-Phase-Matched Second-Harmonic Generation and Sum-Freq. Mixing in Urea"; IEE V QE 15(10), Oct. 1979.
Halbout et al; "Nonlinear Optical Properties of N,N'-Dimethylurea"; Appl. Phys. Lett., vol. 37(10) 15 Nov. 1980.
Jrnl. of Molecular Structure, 47 (1978) 393-396, Elsevier Scientific Publishing Co., Amsterdam, Netherlands, "Optical Second Harmonic Generation in Organic Crystals: Urea and Ammonium-Malate".
IEEE Jrnl. of Quantum Electronics, Vol. QE-15, No. 10, October 1979, "Efficient Phase-Matched Second-Harmonic Generation and Sum-Frequency Mixing in Urea".
IEEE Jrnl. of Quantum Electronics, V.QE-15, No. 6, Jun. 1979, "Optical Parametric Oscillator Threshold and Linewidth Studies".
Jrnl. of Quantum Electronics, V. QE-7, No. 3, Mar. 1971, "Some Effects of Spatially Nonuniform Pumping in Pulsed Optical Parametric Oscillators".
Optics Communications, V29, No. 2, May 1979, "Nonlinear Optical Properties of Urea".

*Primary Examiner*—Leon Scott, Jr.
*Attorney, Agent, or Firm*—Jones, Tullar & Cooper

[57] ABSTRACT

A new optical parametric oscillator which employs a urea crystal is disclosed. The organic crystal makes the oscillator broadly tunable, so that the entire spectral range from the ultraviolet to the near infrared is accessible.

The urea optical parametric oscillator is angle tunable, and has a high efficiency.

16 Claims, 4 Drawing Figures

OPTICAL PARAMETRIC OSCILLATOR USING UREA CRYSTAL

This invention was made with Government support under Grant No. DMR 82-17227 awarded by the National Science Foundation. The Government has certain rights in this invention.

BACKGROUND OF THE INVENTION

The present invention relates, in general, to optical parametric oscillators, and more particularly to such an oscillator incorporating a urea crystal as the nonlinear medium.

The very high power densities made available by lasers have made it possible to observe the nonlinear effects of crystals, including the frequency doubling effect. This occurs when a radiation of frequency $\nu$, on propagating through some crystalline materials, emerges as radiation consisting of a mixture of two frequencies, the original frequency $\nu$ and a new frequency $2\nu$, the double frequency component having a wavelength which is one-half the incident radiation.

The explanation of such nonlinear effects lies in the way in which a beam of light propagates through a solid material, the electromagnetic radiation interacting with dipoles in the material and causing them to oscillate. As the intensity of the radiation increases, so does the amplitude of vibration and eventually harmonics are produced. The strongest harmonic is the second, at twice the frequency of the incident radiation, and for this reason the frequency doubling effect is also referred to as second harmonic generation. However, not all materials exhibit frequency doubling.

Early experiments in frequency doubling gave very low conversion efficiencies of about 1%, due to the fact that dispersion within the crystal caused the frequency doubled light to travel at a different velocity than the incident light. This resulted in destructive interference and periodic fluctuations in the intensity of the frequency doubled light. However, it was found that equalization of the velocities of the light, or phase matching, could be achieved using birefringent crystals such as ADP or KDP, if the light dispersion is less than the birefringence. Such materials provide 20-30% efficiencies, but are limited in the frequencies of light that can be produced. Other materials have been tried, but optical damage often limits their operation.

Frequency doubling is a specific example of what is known as the sum-frequency generation process. Consider two sinusoidally varying electromagnetic fields of different frequencies denoted by $E\omega_1$ and $E\omega_2$ and with frequencies $\omega_1$ and $\omega_2$ respectively, then the polarization produced by these fields acting together can be expressed in the form:

$$P = \chi E\omega_1 E\omega_2 \quad (1)$$

where $\chi$ is the susceptibility. It can easily be deduced that electromagnetic waves at two new frequencies $\omega_3$, $\omega_3'$ will be produced and these frequencies are given by $$\omega_3 = \omega_1 + \omega_2 \quad (2)$$

$$\omega_3' = \omega_1 - \omega_2 \quad (3)$$

Such effects only occur in non-centrosymmetric materials. In the case of frequency doubling $E\omega_1$ and $E\omega_2$ are identical and equations (2) and (3) hold to give a new wave of frequency $2\omega$ and a d.c. component respectively.

$E\omega_1$ and $E\omega_2$ are often known as the pump and the signal, the pump being of higher frequency.

It can be seen from equations (2) and (3) that if $\omega_1$ and $\omega_2$ are fixed, then $\omega_3$ is also fixed as a sum or difference frequency. However, if only one of the three frequencies is fixed then the other two frequencies $\omega_1$ and $\omega_2$, are free to range over many values, provided the sum of their frequencies is equal to that of the fixed frequency.

The inverse of the foregoing sum-frequency process is the optical parametric process, where two variable frequencies are decided by the particular phase matching used. Only one pair of frequencies can be phase matched at a time. By adjusting the phase matching parameters, e.g. the temperature or orientation of the nonliner crystal, the laser can be tuned over a range of frequencies. The process of converting a wave having a frequency $\omega_3$ into two lower frequency waves $\omega_1$ and $\omega_2$ is called the optical parametric process.

The parametric oscillator uses a nonlinear crystal to convert the pump light into two signals, the sum of whose frequencies equals the frequency of the pump light. Thus, the oscillator produces two outputs, the signal, and a difference frequency, which is referred to as the idler. These frequencies can be tuned by index matching, as by rotating the crystal or by controlling the temperature of the crystal. Since a parametric oscillator has gain at its signal and idler output frequencies, it can be used as an amplifier at either frequency.

Tunability of a parametric amplifier or oscillator is important because there are optical instruments whose performance would benefit tremendously by replacing conventional light with a tunable laser. Absorption spectrometers, for example, employ a white light source and narrow regions of the spectrum are selected by a narrow band filter which usually takes the form of a diffraction grating. The amount of light obtained at any one wavelength is clearly only a very small fraction of the total light energy emitted by the lamp. The use of a laser would enable all of the energy to be concentrated into any required region of the spectrum. Further, the narrow linewidth of the laser would result in much higher resolution. Flash photolysis, in which fast chemical reactions and short lived chemical compounds can be examined, would also clearly benefit from a pulsed tunable laser.

SUMMARY OF THE INVENTION

The present invention is directed to a new tunable optical parametric oscillator which employs an organic crystal as the nonlinear medium. The particular crystal used is urea, and this material permits tuning of the oscillator to produce output radiation throughout most of the visible spectrum, and in the near infrared regions as well. The broad tunability of the urea optical parametric oscillator makes it possible to generate radiation in previously difficult spectral regions, and provides a convenient, solid state source of coherent radiation. The urea crystal has a high efficiency which makes it competitive with established visible and IR dye lasers and color center lasers.

To incorporate urea in a practical nonlinear device, crystals with large apertures and optical lengths must be grown. Such crystals are disclosed in U.S. patent application Ser. No. 478,601, of William R. Donaldson and Chung L. Tang, filed Mar. 24, 1983, the disclosure of which is incorporated herein by reference.

Urea is in the space group class $\bar{4}2m$, which is the same space group as KDP. But urea is a positive uniaxial crystal with a large birefringence, so both type I (o→ee) and type II (o→oe) phase matching are possible in urea. In a positive uniaxial crystal, type II phase matching can occur at 90° to the optic axis with a nonvanishing effective d coefficient, which is not true for type I processes. This is extremely important, because at 90° noncritical phase matching occurs. Accordingly, the interaction between the light frequencies within the crystal is not sensitive to angular deviations, and the waves do not suffer from "walk off" due to double refraction. Thus, the interaction length extends over the entire length of the crystal.

In one form of the invention, the crystal is mounted in the path of a laser beam, the incident beam propagating through the crystal perpendicular to the [110]crystallographic direction or parallel to the (110) face. Parallel dichroic cavity mirrors are placed on opposite sides of the crystal, and the incident beam pumps the crystal to produce optical parametric oscillation and two output wavelengths. The angle of the crystal with respect to the incident beam, and with respect to the dichroic mirrors, is adjustable to tune the output light beams. This is done by rotating the crystal about the [110]axis. Although a lateral displacement of the pump, signal and idler waves with respect to the central geometric axis of the cavity results, no misalignment occurs in a cavity using parallel mirrors.

It has been found that in one embodiment of the invention such angle tuning enables the crystal to produce output wavelengths continuously between about 5,000Å (500 nm), which is in the bluegreen range, and about 12,200Å (1220 nm) in the near infrared range, with a pump wavelength of 3547Å. This wide tuning range, ease of operation, and the high output power available with such a crystal, makes the urea optical parametric oscillator a competitive source of coherent radiation, with the added advantage of being able to operate in regions of the spectrum inaccessible to presently available sources.

BRIEF DESCRIPTION OF THE DRAWINGS

The foregoing and additional objects, features, and advantages of the present invention will be understood from the following detailed description of a preferred embodiment thereof, taken in conjunction with the accompanying drawings, in which.

DESCRIPTION OF A PREFERRED EMBODIMENT

Figure 1:
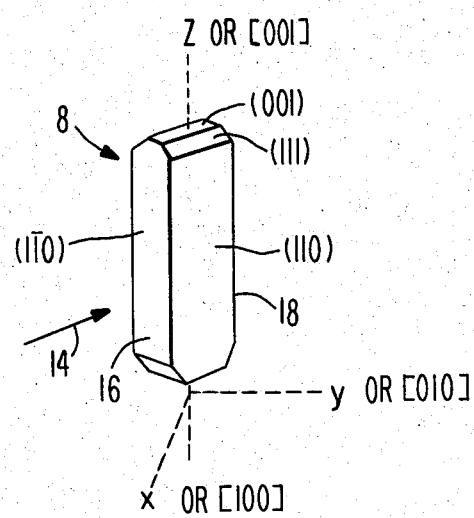
FIG. 1 is a diagrammatic illustration of a urea crystal for the use in the optical parametric oscillator of the present invention.

FIG. 1 illustrates a typical urea crystal 8 produced in accordance with the method set forth in the aforesaid application Ser. No. 478,601. The crystal used in the parametric oscillator 12 shown in FIG. 2 had physical dimensions of 4.2 mm along the [110]axis, 12.7 mm along the [1$\bar{1}$0] axis, and 20.0 mm along the [001] axis. The beams are propagated through the crystal in a direction parallel to the (110) plane, as illustrated by incident beam 14, through entrance and exit faces 16 and 18, respectively, these faces being cleaved surfaces.

In an experimental oscillator using such a crystal, the phase matching conditions for the crystal were determined numerically by using the Sellmeier equations:

$$n_o^2(\lambda) = 2.1548 + 0.0131/(\lambda^2 - 0.0318), \quad (4)$$

$$n_e^2(\lambda) = 2.5527 + [0.01784/([0^2 - 0.0294)] + 0.0288(\lambda - 1.50)/[(\lambda - 1.50)^2 - 0.03371]. \quad (5)$$

The Sellmeier coefficients were calculated using indices measured with a minimum deviation technique with wavelengths as long as 1,064 nm. The IR resonance term in the extraordinary index was determined by fitting the data from the noncritical phase matching point. For wavelengths longer than 1060 nm the calculated tuning curves were only approximately correct due to the lack of information about the ordinary indices and the high sensitivity of the tuning curve to small changes in the Sellmeier equation for the ordinary index in this range. The equations demonstrated that both the third and fourth harmonics of a yttrium aluminum garnet (YAG) laser could be phase matched for optical parametric oscillation at 90° within the transparency range of the urea crystal.

Figure 4:
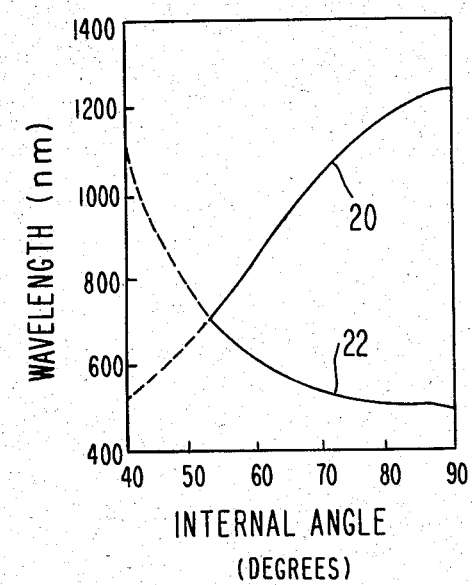
FIG. 4 is an experimental tuning curve for a urea crystal.

The Sellmeier coefficients calculated from the foregoing equations are illustrated in the graph of FIG. 4, wherein curve 20 represents the calculated relationship between the wavelength and the internal angle of the crystal for the extraordinary tuning branch (equation 5) and curve 22 represents the ordinary tuning branch (equation 4). The curves refer to a pump wavelength of 3547Å (354.7 nm). Furthermore, the calculated coefficients refer only to the particular crystal used. For different crystals, these curves may vary only slightly.

The crystal used in the experiment referred to above used a urea crystal doped with 1% bromine by weight; however, such doping is not always necessary. It was found that the Br doping shifted the transmission cutoff toward the red. The ultraviolet cutoff for pure urea is 200 nm, but the doping used in the experimental device shifted the cutoff to 217 nm. A Debye-Scherrer X-ray analysis of the doped sample showed no change in the crystallographic structure as a Cresult of the doping. However, the change in the absorption affects the indices of refraction, possibly in a spatially non-uniform manner.

Figure 2:
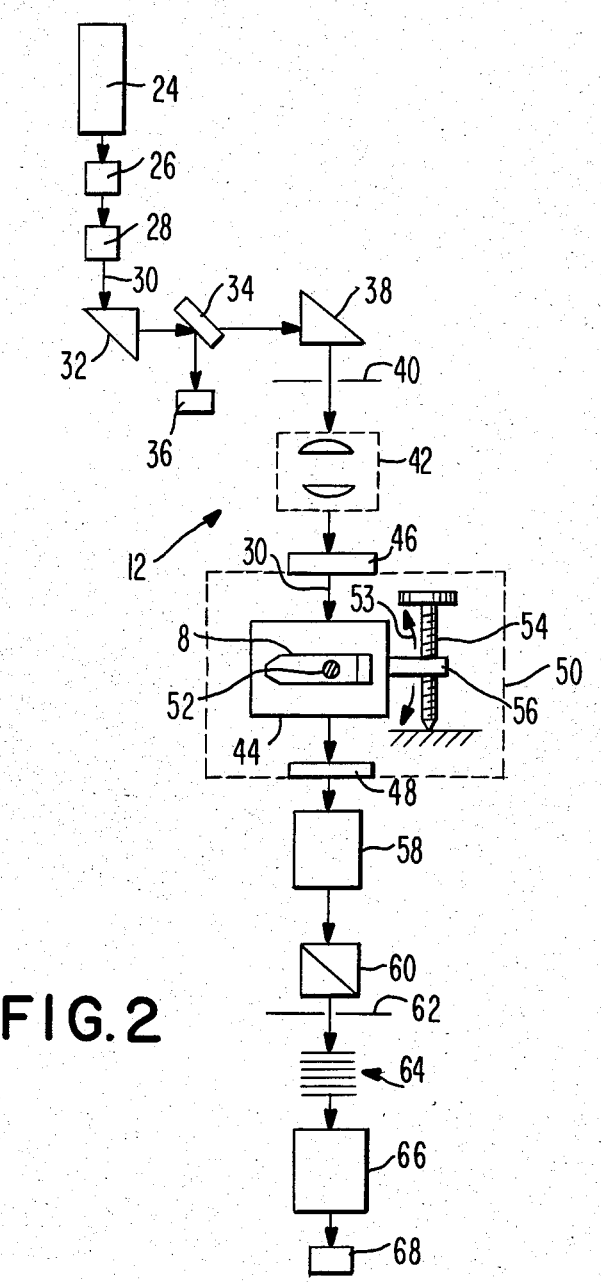
FIG. 2 is a schematic diagram of an optical parametric oscillator.

A schematic illustration of the experimental set-up is shown in FIG. 2. A Nd:YAG laser 24 provided the pump beam for the oscillator, filters 26 and 28 limiting the output beam 30 to the third harmonic, which had a wavelength of 3547Å. The laser 24 produced a maximum peak power at this wavelength of 1.5MW, with a 10 Hz repetition rate and a 7 ns pulse duration. The unstable resonator in the laser used in this experiment produced a donut mode in the near field.

Beam 30, which had a diameter of 6 mm, was directed by steering prism 32 through a beamsplitter 34, with a portion of the beam being directed to a silicon photodiode 36 for use in monitoring the input power, and the remainder being directed to a second steering prism 38. The latter prism directed the beam through a pinhole 40 and a collimating telescope 42 to decrease the diameter of the pump beam to 2 mm, a diameter commensurate with the crystal aperture, and to increase the incident intensity. This produced a beam having a maximum incident intensity of 90.4 MW/cm² at the crystal, which was more than an order of magnitude below the single shot damage threshold of urea at the wavelength being used. Thus, the operation of the oscillator was not limited by damage to the urea crystal.

The urea crystal 8 was mounted inside a protective cell which, because urea is hygroscopic, is filled with either a dry atmosphere or an index matching fluid. In order to reduce Fresnel reflection losses, particularly at non-normal beam incidence when tuning the optical parametric oscillator, hexane was used as an index matching liquid in the cell 44 in this experiment. At opposite sides of the cell were mounted plane parallel dichroic mirrors 46 and 48 which formed, with cell 44, a resonant cavity 50. The oscillator 12 was chosen to be singly resonant, so the dichroic mirrors 46 and 48 had reflectivities greater than 99% at 500 nm, the signal wavelength produced by the crystal (curve 22 of FIG. 4). This green light was polarized the same as the pump, so it was advantageous to oscillate the cavity at this wavelength.

The crystal 8 was mounted for angular motion about the [110] axis, and thus was mounted to rotate about a pivot point perpendicular to the beam 30, such as shaft 52, for example, so that the motion of the crystal is in the plane of the drawing as illustrated by arrows 53 in FIG. 2. Control of the pivotal motion may be by any convenient means, a threaded shaft 54 passing through a bushing 56 secured to cell 44 being a merely exemplary arrangement.

Variation in the angle of crystal 8 with respect to the direction of the incident beam 30 served to tune the crystal 8. It was found that as the crystal was angle tuned the two ordinary beams, the pump and the signal, would not walk off from each other even at high angles, so that the entire length of the crystal could be used without being limited by walk off. All of the idler light, which did walk off, was dumped through the mirror 48.

Since both mirrors 46 and 48 were plane parallel, the cavity 50 was an unstable resonator. However, the flat-flat cavity had a distinct advantage when the optical parametric oscillator was tuned by rotating the urea crystal about the [110] axis. This caused a lateral displacement of the pump, signal, and idler with respect to the central geometric axis of the cavity. Since the beams were only displaced and not steered by the crystal, no misalignment occurred with the flat-flat cavity because of angle tuning. The cavity 50 had a physical length of 7.5 cm and an optical path length of 9 cm at 90°. This allowed only 12 round trip passes of the green signal light while the 7ns pump pulse was incident on the cavity. Thus, every effort was made to keep the cavity length as short as possible. The shorter the cavity, the smaller the pump intensity that was needed to obtain oscillation threshold.

No attempt was made to optimally couple the green light out of the cavity 50. Instead, the cavity Q was kept as high as possible to facilitate oscillation. Because of the high reflectivity of the cavity, the output signal wave was small, but since there was little or no reflectivity at idler wavelengths, the performance of the optical parametric oscillator 12 was monitored by observing the dumped idler, which was an extraordinary wave (curve 20 in FIG. 4) and was polarized perpendicular to the ordinary pump and signal. The idler, and low-level pump and signal waves, passed through mirror 48, through a series of Brewster polarizer plates 58, and through a Glan-Thompson prism 60 to a second pinhole 62, to separate the idler from the pump and signal. The waves passing through the pinhole 62 then passed through a stack of IR transmitting filters 64 and a monochrometer 66 to a germanium photodiode 68. The Brewster plates and the Glan-Thompson prism insure that the signal and pump waves do not reach the photodiode 68, to permit accurate measurement of the idler output. Of course, the signal wave could have been selected for the measurement, if desired.

Figure 3:
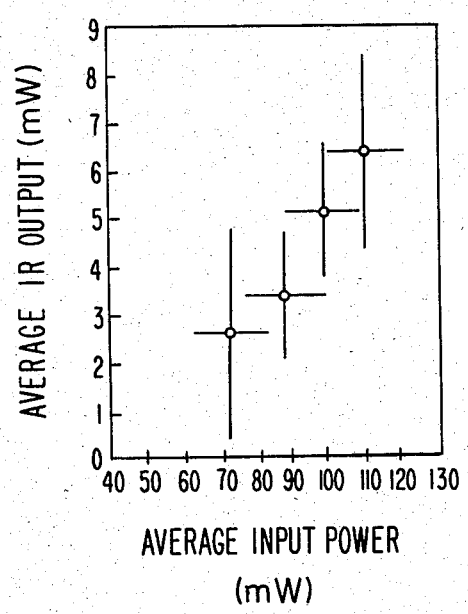
FIG. 3 is a graph illustrating the average IR output power vs. average input power for one embodiment of the invention.

Power and efficiency measurements were done at the 90° phase matching point. Here, the optical parametric oscillator operated at 1,220 nm in the infrared and 500nm in the visible. The signal power was at the maximum and all three waves were collinear in the crystal. The output power was measured as a function of input pump power. The results are shown in FIG. 3. Each point on the curve was averaged over several hundred shots. At the highest point on the graph a peak power of 90 kW in the infrared was obtained. The limit on this curve was the maximum available power from the YAG laser. The measurements were not limited by damage to the crystal, as was mentioned above. It is possible that with more intense pump sources higher peak powers could be obtained. However, at the higher pump intensities that were used, damage to the dichroic mirrors due to the UV pump light started to occur. Optics with higher damage threshold must, therefore, be used to obtain better efficiencies.

To obtain the total energy conversion efficiency of the pump into both the signal and idler, the points in FIG. 3 must be multiplied by 3.44. The maximum total conversion efficiency that was obtained was 20.5%. The threshold pump power was determined by fitting the efficiency data to the analysis done by Bjorkholm as reported in the IEEE Journal of Quantum Electronics, Vol. 7, p. 109 (1971), and extrapolating the result, to zero efficiency. This yielded a threshold of 45 mW average power at 3547Å or an energy fluence of 388 mJ/cm². The threshold fluence $J_0$ can be calculated using the result of Brosnan and Byer as reported in the IEEE Journal of Quantum Electronics, Vol. 15, p. 415 (1979), which relates the threshold to the cavity parameters:

$$J_0 = \left(\frac{2.25\tau}{Kg_s l^2}\right)\left[\left(\frac{L}{2\tau c}\right)\ln\left(\frac{P_n}{P_0}\right) + 2\alpha l + \ln(R^{-\frac{1}{2}}) + \ln 2\right], \quad (6)$$

$$K = 2\omega_s\omega_i d_{eff}^2/n_s n_i n_p \epsilon_0 c^3, \quad (7)$$

where $g_s$ is the mode coupling coefficient, $l$ the crystal length, L the optical cavity length, $P_n/P_0$ the ratio of the signal power in the cavity at threshold to the parametric scattering power, $\alpha$ the crystal absorption coefficient, and R the product of the mirror reflectivities. For the particular cavity used in this example, this yields a value of 429 mJ/cm² or about 10% larger than the measured value.

In the particular experiment described hereinabove, rotation of the crystal 8 was between 90° and about 55°, to obtain a tuning range of from 500 nm to about 700 nm for the signal wave, and the corresponding idler wave varied from 1220 nm to about 700 nm, so that the oscillator is continuously tunable from 500 nm to 1200 nm.

Using the cavity configuration such that the ordinary wave is resonated in the cavity, there will be no walk off limitations as the optical parametric oscillator is angle tuned; therefore, noncritical phase matching is not essential for this particular configuration. Also, the threshold and output power scale as the square of the effective d coefficient $d_{36} \sin \theta$, which is angle independent. Therefore, the output power will remain angle independent so long as the pump is incident on a (110) surface of a fixed length crystal placed in an index matching liquid so that the reflection losses do not increase appreciably.

Other pumping schemes are also possible. For example, the fourth harmonic of the YAG can be phase matched at 90°. With angle tuning, this gives a tuning range near 400 nm. Thus, a urea optical parametric oscillator is a source of tunable ultraviolet radiation.

The Brewster plate 58 and the monochrometer 66 may be used to measure the linewidth of the output signal light. This was measured at two points: $\theta_m = 90°$ and $\theta_m = 87°$. In both instances the full width at half-maximum of the signal was less than the 0.5Å resolution of the monochrometer, and was limited only by the crystal length, not by pump beam divergence.

Thus there has been disclosed a new optical parametric amplifier which employs a urea crystal as the nonlinear medium. This oscillator will operate at the noncritical phase matching point with type II phase matching. A tuning range of between about 500 nm and about 1200 nm, extending over almost the entire visible and near infrared region of the spectrum is available, using a pump source of about 355 nm. The tuning range can be extended even further using different pump wavelengths, such as the fourth harmonic of YAG. The device gives reasonable conversion efficiencies, having been operated with average output power of 6 mW at 1,220 nm for a conversion efficiency of 6% in the IR range, and with a total conversion efficiency (IR and visible) of 20%. This was accomplished at an incident intensity which was more than an order of magnitude below the damage threshold of urea.

Although the present invention has been described in terms of a preferred embodiment thereof, it will be apparent that numerous modifications and variations can be made without departing from the true spirit and scope thereof, as set forth in the accompanying claims.

What is claimed is:

1. A tunable optical parametric oscillator, comprising:
    a pump source producing a pump beam at a first frequency and a first wavelength;
    a resonant cavity incorporating a nonlinear organic crystal aligned with and responsive to said pump beam to produce at least an output signal beam at a second frequency and a second wavelength which is longer than said first wavelength; and
    means for adjusting the angle of said crystal with respect to said pump beam to tune said oscillator in order to vary the frequency and wavelength of said output signal beam.

2. The parametric oscillator of claim 1, wherein said crystal is urea.

3. The parametric oscillator of claim 1, wherein said adjusting means is movable to tune the output wavelength through the visible spectral range and the near infrared.

4. The parametric oscillator of claim 1, wherein said adjusting means is movable to tune the output wavelength in the ultraviolet spectral range.

5. The parametric oscillator of claim 1, wherein said crystal is further responsive to said pump beam to produce an output idler beam at a third frequency and a third wavelength which is longer than both said first and second wavelengths.

6. The parametric oscillator of claim 5, wherein said means for adjusting the angle of said crystal further tunes said oscillator in order to vary the frequency and wavelength of said idler beam.

7. The parametric oscillator of claim 6, wherein the sum of said second and third frequencies equals said first frequency, and wherein, for a fixed first frequency, said second and third frequencies may be varied by adjusting the angle of said crystal.

8. A tunable parametric oscillator, comprising:
    a source of coherent radiation producing a pumping beam of light at a first selected wavelength; and
    a cavity incorporating a nonlinear organic crystal in the path of said pumping beam, said crystal being responsive to said pumping beam to produce an output coherent signal beam at a second selected wavelength longer than said first wavelength.

9. The oscillator of claim 8, further including means for varying the angle of said crystal with respect to the path of said pumping beam to vary the wavelength of said signal beam.

10. The oscillator of claim 9, wherein said crystal is urea.

11. The oscillator of claim 8, wherein said crystal is urea, and further including means for varying the angle of said urea crystal with respect to the path of said pumping beam to vary the wavelength of said signal beam through a selected spectral range.

12. The oscillator of claim 8, wherein said crystal is further responsive to said pumping beam to produce an output coherent idler beam at a third selected wavelength.

13. The oscillator of claim 12, further including means for varying the angle of said crystal with respect to the path of said pumping beam to vary the wavelengths of said signal and idler beams, whereby said oscillator generates output coherent radiation substantially throughout the visible and near infrared spectrum.

14. The method of producing coherent radiation tunable throughout the visible, ultraviolet, and near infrared spectrum, comprising:
    generating a pumping beam of coherent radiation at a first wavelength;
    directing said pumping beam into a cavity including a urea crystal to produce parametric oscillation in said crystal;
    directing coherent signal and idler waves at second and third wavelengths out of said cavity; and
    varying the angle of said crystal with respect to the path of said pumping beam to tune the oscillation of said crystal, whereby the wavelengths of said signal and idler waves are varied.

15. The method of claim 14, wherein said pumping beam has a first frequency, said first frequency and first wavelength being fixed, and wherein said signal and idler waves have second and third frequencies, respectively, the sum of said second and third frequencies being equal to said first frequency.

16. The method of claim 15, wherein the tuning of said oscillation varies the frequency and wavelength of each of said signal and idler wave.

* * * * *